United States Patent
Choi et al.

(10) Patent No.: US 9,494,825 B2
(45) Date of Patent: Nov. 15, 2016

(54) CONDENSING SHEET AND METHOD FOR PREPARING THEREOF

(75) Inventors: Hang-Suk Choi, Cheongju-si (KR);
Hoon-Seon Lee, Cheongju-si (KR);
Pyung-Gun Jun, Seoul (KR);
Won-Bong Kwak, Cheongju-si (KR);
(Continued)

(73) Assignee: LG Chem, Ltd., Seoul (KR)

( * ) Notice: Subject to any disclaimer, the term of this patent is extended or adjusted under 35 U.S.C. 154(b) by 345 days.

(21) Appl. No.: 12/310,718

(22) PCT Filed: Sep. 6, 2007

(86) PCT No.: PCT/KR2007/004313
§ 371 (c)(1),
(2), (4) Date: Mar. 5, 2009

(87) PCT Pub. No.: WO2008/030052
PCT Pub. Date: Mar. 13, 2008

(65) Prior Publication Data
US 2009/0323313 A1 Dec. 31, 2009

(30) Foreign Application Priority Data
Sep. 6, 2006 (KR) .................. 10-2006-0085821

(51) Int. Cl.
*G09F 13/04* (2006.01)
*G09F 13/08* (2006.01)
*G02F 1/1335* (2006.01)
*G02B 3/00* (2006.01)

(52) U.S. Cl.
CPC ....... *G02F 1/133606* (2013.01); *G02B 3/0006* (2013.01); *G02F 2001/133607* (2013.01)

(58) Field of Classification Search
CPC ............. G02B 6/0065; G02B 6/0055; G02F 2001/133607; G02F 1/133606; G02F 1/133605; G02F 1/133604
USPC .................. 362/97.1, 97.2, 327, 84, 268
See application file for complete search history.

(56) References Cited

U.S. PATENT DOCUMENTS

| | | | | |
|---|---|---|---|---|
| 4,927,233 A | * | 5/1990 | Nakanishi | G03B 21/625 359/456 |
| 6,381,071 B1 | * | 4/2002 | Dona | G02B 3/0031 359/455 |
| 7,309,149 B2 | * | 12/2007 | Lee et al. | 362/339 |
| 7,837,343 B2 | * | 11/2010 | Shibasaki et al. | 362/84 |

(Continued)

FOREIGN PATENT DOCUMENTS

CN  1936421  3/2007
EP  0945742 A1  9/1999
(Continued)

OTHER PUBLICATIONS

Machine translation for JP 2007171625.*
European Office Action in Application No. 07 808 106.4, dated Feb. 26, 2013.

*Primary Examiner* — Peggy Neils
*Assistant Examiner* — Tsion Tumebo
(74) *Attorney, Agent, or Firm* — Dentons US LLP

(57) ABSTRACT

A condensing sheet includes a light output unit that has a plurality of lenses, and a light input unit that faces the light output unit and includes a light penetration unit and a light reflection unit. The light reflect ion unit has a structure including a recess sinking toward the light output unit and a reflector received in the recess.

9 Claims, 7 Drawing Sheets

(75) Inventors: Dong-Cheol Choi, Cheongju-si (KR);
Jin-Kyu Kim, Cheongju-si (KR)

(56) References Cited

U.S. PATENT DOCUMENTS

| | | | |
|---|---|---|---|
| 2001/0012078 A1* | 8/2001 | Hira et al. ................... 349/95 |
| 2001/0019378 A1 | 9/2001 | Yamaguchi |
| 2002/0180909 A1* | 12/2002 | Lubart ................... F24J 2/06 |
| | | | 349/113 |
| 2005/0122591 A1* | 6/2005 | Parker ................... F21V 5/00 |
| | | | 359/619 |
| 2006/0050534 A1 | 3/2006 | Lee et al. |
| 2006/0285312 A1* | 12/2006 | Ogawa et al. ................ 362/97 |
| 2007/0002583 A1* | 1/2007 | Lee et al. ................... 362/606 |
| 2007/0076406 A1* | 4/2007 | Kodama et al. ............. 362/97 |
| 2008/0042568 A1* | 2/2008 | Cha ........................ H01J 11/12 |
| | | | 313/582 |
| 2008/0192484 A1* | 8/2008 | Lee et al. ................... 362/327 |
| 2009/0169820 A1* | 7/2009 | Koike ............. B29D 11/00278 |
| | | | 428/156 |
| 2009/0257000 A1* | 10/2009 | Ogasawara .......... G02B 3/0056 |
| | | | 349/64 |
| 2010/0232142 A1* | 9/2010 | Kim et al. ................. 362/97.2 |

FOREIGN PATENT DOCUMENTS

| | | | |
|---|---|---|---|
| EP | 1118883 A2 | | 7/2001 |
| JP | 2001-201611 A | | 7/2001 |
| JP | 2004-309525 A | | 11/2004 |
| JP | 2005-221619 A | | 8/2005 |
| JP | 2005-301116 A | | 10/2005 |
| JP | 2006-208930 A | | 8/2006 |
| JP | 2007114371 A | * | 5/2007 |
| JP | 2007171625 A | * | 7/2007 |
| KR | 2006-0023452 A | | 3/2006 |
| TW | 489243 | | 6/2002 |

* cited by examiner

CONDENSING SHEET AND METHOD FOR PREPARING THEREOF

This application claims the benefit of PCT/KR2007/004313 filed on Sep. 6, 2007, and Korean Patent Application No. 10-2006-0085821 filed on Sep. 6, 2006, the contents of which are hereby incorporated herein by reference for all purposes in their entirety.

TECHNICAL FIELD

The present invention relates to a condensing sheet that includes a reflector having improved reflectivity and hiding power to maximize light efficiency of a light input unit, a method of manufacturing the condensing sheet, a backlight assembly including the condensing sheet, and a liquid crystal display including the backlight assembly.

This application claims priority from Korean Patent Application No. 10-2006-0085821 filed on Sep. 6, 2006 in the Korean Intellectual Property Office, the disclosure of which is incorporated herein by reference in its entirety.

BACKGROUND ART

In general, a condensing sheet used in a liquid crystal display includes a base layer 60, and a linear prism 50 that is formed on the base layer 60 and has a triangular section, which is shown in FIG. 1. However, the condensing sheet is disadvantageous in that it is difficult to control a viewing angle and to improve optical performance such as condensing efficiency and contrast because light L2 incident at an ineffective angle shown in FIG. 1 causes sidelobes.

In order to avoid the above-mentioned disadvantages, a condensing sheet that includes a base layer 20, a light output unit which is formed on an upper side of the base layer 20 and has a lens 30, and a light input unit 10 which is formed on a lower side of the base layer 20 and includes a protrusion 11b and a reflector 12b is shown in FIG. 2.

In the condensing sheet of FIG. 2, since light L1 that is incident at an effective angle passes through the lens 30, and light L2 that is incident at an ineffective angle is recycled by using the reflector 12b, condensing may be performed at an effective angle to relatively improve light efficiency. However, if a current printing process for forming the reflector 12b is used, that is, if a printing process on a flat surface of the protrusion 11b (FIG. 3) and a process of performing exposure by using a photomask and then removing a penetration unit 13 (FIG. 4) are used, as shown in FIGS. 3 and 4, the printing is performed so that thicknesses 12s of both sides of the reflector 12b are smaller than the thickness 12t of the center of the reflector. Thus, light loss occurs in the light input unit 10 during the radiation of light L2 that is incident at an ineffective angle. That is, light L2 that is incident at an ineffective angle does not reflect by the reflector 12b but passes through the protrusion 11b.

In order to maximize light efficiency of the light input unit 10, pigments such as $TiO_2$, $Al_2O_3$, and $BaSO_3$ are added to ink that constitutes the reflector 12b and is made of a UV-curable polymer resin or a thermosetting polymer resin in a predetermined amount in FIG. 5, or are applied to a predetermined thickness in FIGS. 6 and 7 to perform reflection. Thereby, reflectivity and hiding power are improved. However, if the reflector 12b is printed by using a current printing process, as shown in FIGS. 3 and 4, the thicknesses 12s of both sides of the reflector 12b are small, thus reducing the reflectivity and hiding power of both sides of the reflector 12b.

Specifically, if the reflector 12b is printed on the flat protrusion 11b having a rectangular section by using a printing process such as gravure printing, offset printing, silk screen printing, and inkjet printing, as shown in FIG. 3, the reflector 12b is printed so that both sides of the reflector 12b have the small thickness 12s. Since both sides of the reflector 12b have the small thickness 12s, significant light loss occurs. If a large amount of pigment is mixed with the ink in order to improve reflectivity, it is difficult to perform uniform printing due to agglomeration resulting from poor dispersion of the pigment or the impurity, which is shown in FIG. 13.

In FIG. 4, a printing process using photomask exposure has a disadvantage in that a penetration unit 13 needs to be removed after the exposure. Accordingly, a clear printing line is not formed and it is difficult to ensure a good appearance. Furthermore, since it is difficult to form the fine penetration unit 13 having the size of 40 microns or less and to print the reflector 12b having a desirable thickness, it is difficult to improve reflectivity and wear resistance of the reflector 12b is reduced. Therefore, it is difficult to optimize the quality and production cost is increased due to an exposure process.

In the reflector 12b of FIGS. 3 and 4, since the thickness 12s of each of both sides is small as compared to the thickness 12t of the center, when light L2 is incident on both sides of the reflector 12b at an ineffective angle, the intensity of reflection light is relatively weak and the intensity of penetration light is relatively strong, thus reducing hiding power.

The weak intensity of reflection light means that the intensity of light capable of being reused at an effective angle is weak. The occurrence of light that penetrates the reflector 12b at an ineffective angle means that a loss of light occurs at an ineffective angle.

If both sides of the reflector 12b having the small thickness 12s have reflectivity that is the same as or larger than that of the center of the reflector 12b having relatively large thickness 12t, reflection efficiency can be optimized. However, in FIG. 6, even though the different reflectors have the same amount of pigment, the small thickness significantly reduces the reflectivity.

Additionally, when an excessive amount of pigment such as $TiO_2$ is added in order to increase the reflectivity in respects to the same thickness, dispersion of the pigment is poor during the printing process, causing agglomeration of pigment particles. Thus, it is difficult to perform the uniform printing and to increase the reflectivity, which is shown in FIG. 5.

Therefore, in respects to the condensing sheet containing the reflector, there is a need to develop a structure and a method of preventing the above-mentioned problems and improving light efficiency of the light input unit, physical properties such as wear resistance, and uniformity.

DISCLOSURE

Technical Problem

It is an object of the present invention to provide a condensing sheet that includes a reflector having improved reflectivity and hiding power to maximize light efficiency of a light input unit, a method of manufacturing the condensing sheet, a backlight assembly including the condensing sheet, and a liquid crystal display including the backlight assembly.

Technical Solution

According to an embodiment of the present invention, there is provided a condensing sheet that includes a light output unit that has a plurality of lenses, and a light input unit that faces the light output unit and includes a light penetration unit and a light reflection unit. The light reflection unit has a structure receiving a reflector in a recess sinking toward the light output unit.

According to another embodiment of the present invention, there is provided a backlight assembly that includes the condensing sheet, and a light source unit that emits light to the condensing sheet.

According to still another embodiment of the present invention, there is provided a liquid crystal display apparatus that includes a liquid crystal display device, and the backlight assembly.

According to yet another embodiment of the present invention, there is provided a method of manufacturing a condensing sheet, which includes preparing a base layer; forming a plurality of lenses on a first side of the base layer; and forming a light input unit, that includes a plurality of protrusions which each has a structure receiving a reflector in a recess sinking on a surface of the protrusion and a plurality of grooves, on a second side of the base layer.

According to a further embodiment of the present invention, there is provided a method of manufacturing a condensing sheet, which includes preparing a sheet, that includes a plurality of lenses formed on a side thereof and a light input unit, which includes a plurality of protrusions which each has a recess and a plurality of grooves, formed on another side thereof, by using an extrusion molding process; and printing a reflector in the recess of the sheet.

Advantageous Effects

According to the present invention, reflectivity and hiding power of a reflector are improved to maximize light efficiency of a light input unit. Thus, desirable light performances such as brightness and contrast are improved.

Furthermore, a printing process is uniformly performed so that the reflector has a desirable thickness and productivity is improved to reduce the manufacturing cost.

EXPLANATION OF THE SIGNS THAT ARE THE MAIN PART OF THE DRAWINGS

Figure 1:
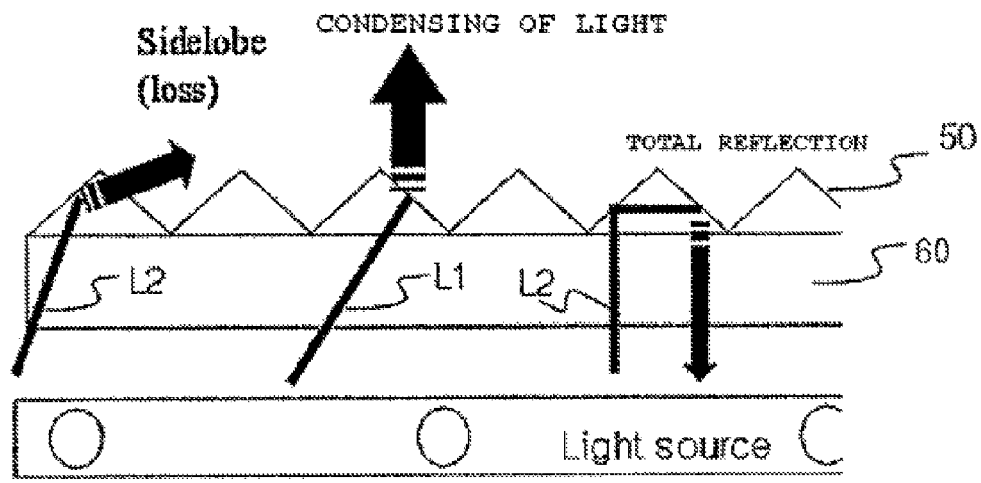
FIG. 1 illustrates light paths of a condensing sheet of a known backlight assembly.
Figure 2:
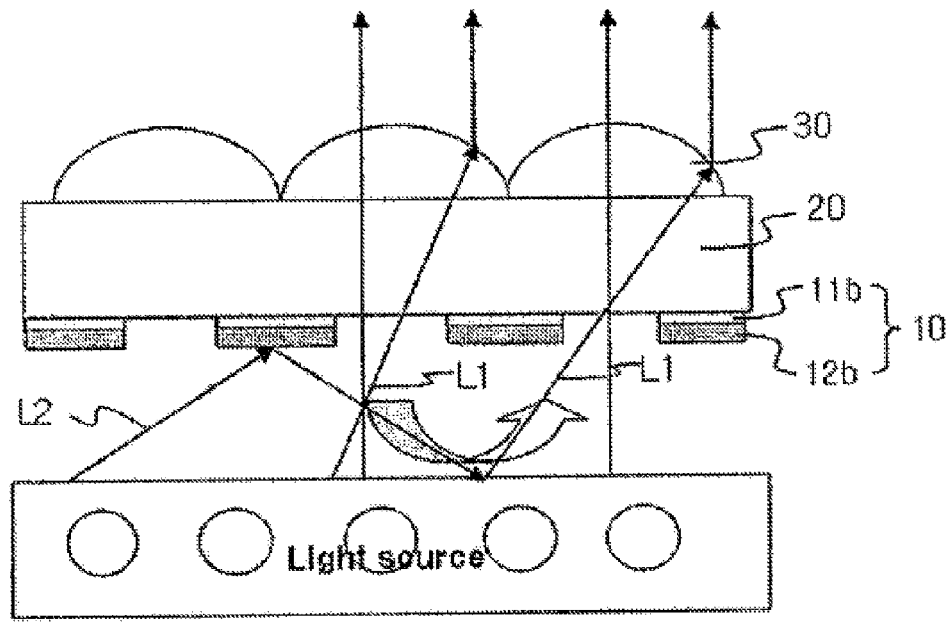
FIG. 2 illustrates light paths of a condensing sheet of a known another backlight assembly.
Figure 3:
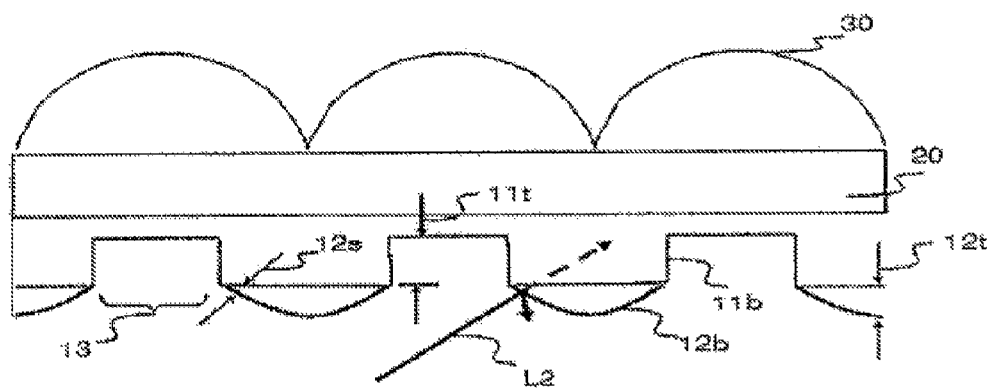
FIG. 3 illustrates printing of a reflector of a known condensing sheet by using a typical printing process and penetration and reflection of light in respects to the reflector of the condensing sheet.
Figure 4:
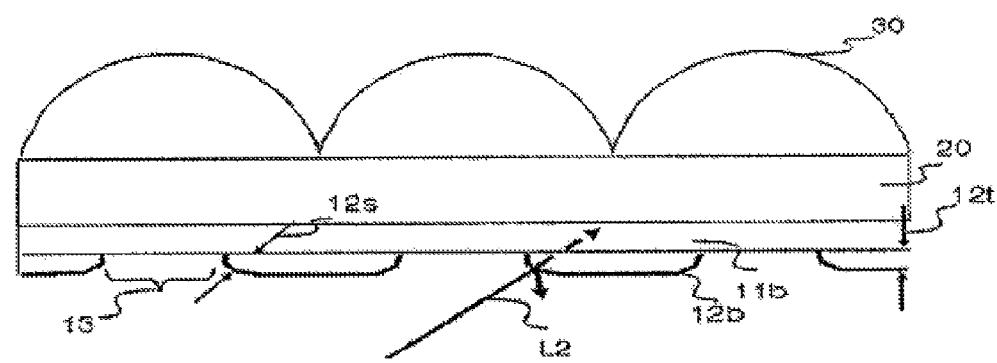
FIG. 4 illustrates formation of a reflector of a known condensing sheet by using a photolithography process and penetration and reflection of light in respects to the reflector of the condensing sheet.
Figure 5:
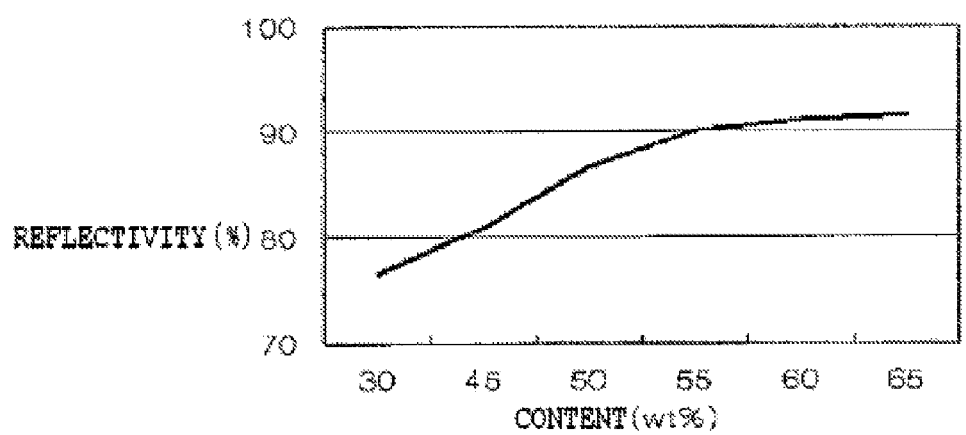
FIG. 5 is a graph illustrating reflectivity of the reflector according to the content of pigment added to form the reflector in respects to reflectors having the same thickness.
Figure 6:
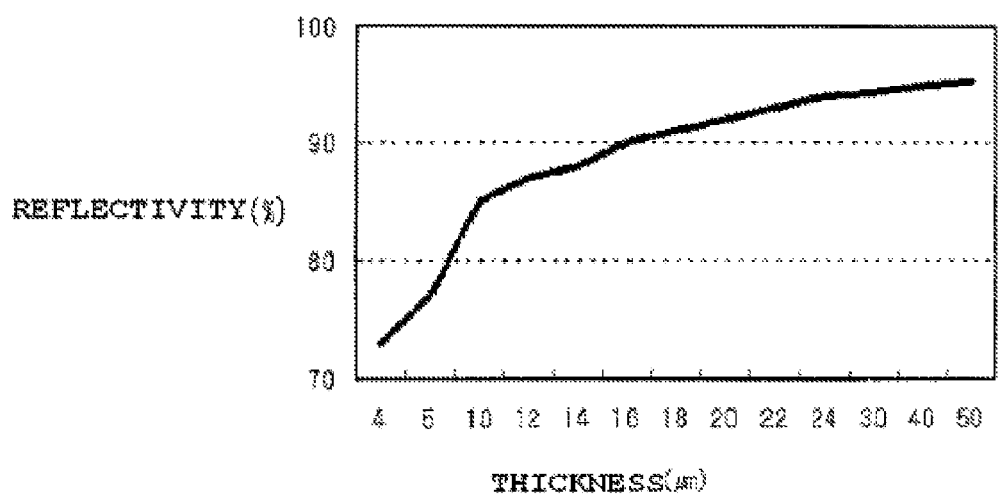
FIG. 6 is a graph illustrating reflectivity of the reflector according to the thickness of the reflector in respects to reflectors including pigments in the same content.
Figure 7:
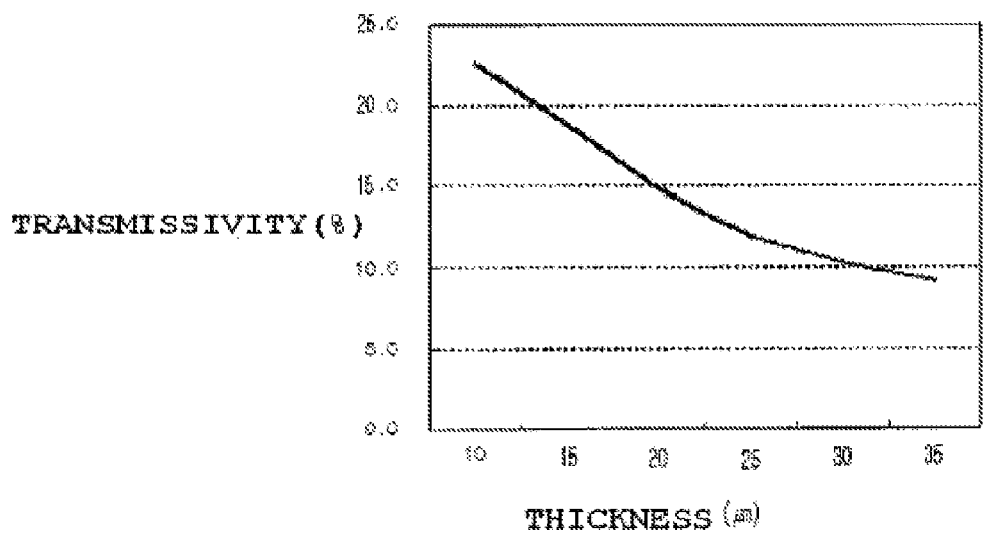
FIG. 7 is a graph illustrating penetration of the reflector according to the thickness of the reflector in respects to the reflector including pigments in the same content.

110: light input unit
111b: protrusions
111d: grooves
111c: recess
112b: reflector
120: base layer
130: light output unit
131: lens

BEST MODE

A condensing sheet according to an embodiment of the present invention includes a light output unit that has a plurality of lenses, and a light input unit that faces the light output unit and has a light penetration unit and a light reflection unit. The light reflection unit has a structure receiving a reflector in a recess sinking toward the light output unit. The condensing sheet may further include a base layer between the light output unit and the light input unit (see FIG. 8). That is, the condensing sheet may include the base layer; the light output unit that has a plurality of lenses provided on a first side of the base layer; and the light input unit that has the light penetration unit and the light reflect ion unit provided on a second side of the base layer. Furthermore, an integrated condensing sheet having no base layer may be manufactured by using an extrusion molding process (see FIG. 9).

The base layer may be formed by using any one or a resin mixture of two or more of polyester, polyvinyl chloride, polycarbonate, polymethylmethacrylate, polystyrene, polyester sulfone, polybutadiene, polyether ketone, acryl, and olefin resins. It is preferable that the base layer be formed of a sheet made of one or more resins selected from the group consisting of polyethyleneterephthalate (PET), polycarbonate, acryl, and COP (cycloolefin) resins.

The light output unit has a plurality of lenses, and each of the lenses may be a lenticular lens having a semicircular section or a linear prism lens having a triangular section.

The lens may be made of a resin selected from the group consisting of a UV-curable resin, an electronic beam-curable resin, and a heat-curable resin, and it is preferable to use a polycarbonate or acryl resin.

The light input unit includes the light penetration unit and the light reflection unit having a structure that includes a recess sinking toward the light output unit and a reflector received in the recess. The light input unit may have grooves and protrusions, and it is preferable that the protrusions and the grooves be continuously and alternately arranged. The grooves function as the light penetration unit, and the light reflection unit may have a structure that includes a recess sinking under the surface of the protrusion toward the light output unit and a reflector received in the recess.

The protrusions and the grooves may be made of a resin selected from the group consisting of a UV-curable resin, an electronic beam-curable resin, and a heat-curable resin, and it is preferable to use a polycarbonate or acryl resin.

Light is incident on the light penetration unit constituting the grooves, and controlling of a viewing angle and front luminance depends on an opening ratio of the light penetration unit. The opening ratio (%) of the light penetration unit may be calculated by using a length 40P of a lens 131 and a length of a penetration area 113 of the light penetration unit shown in FIG. 8 according to the following Equation:
[length of penetration area 113/length 40P of lens 131]×100.

It is preferable that a depth 111$t$ of each of the grooves be in the range of more than 0 μm and 100 μm or less.

The recess may have any one section of a polygonal section that is the shape of a triangle, a square, a trapezoid, a pentagon, or a hexagon, a section that is the shape of polygons continuously connected to each other, an oval section, a section that is the shape of ovals continuously connected to each other, a semicircular section, a section that is the shape of semicircles connected to each other, and a wave section.

Figure 10:
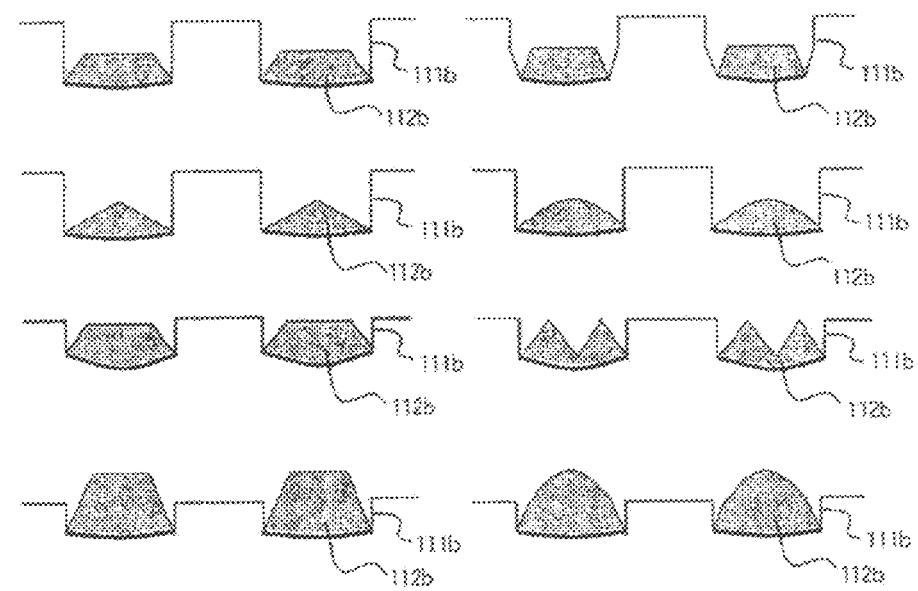
FIGS. 10 and 11 illustrate the reflectors of the condensing sheets according to the embodiments of the present invention.

As shown in FIG. 10, the recess may have a trapezoidal section, a triangular section, an oval section, a pentagonal section, a section that is the shape of two triangles continuously connected to each other, or a semicircular section. However, the shape of the recess is not limited to the shapes of the recesses shown in FIG. 10.

The recess may have a depth 111$s$ which is the same as a depth of each of grooves or larger or smaller than the depth of each of the grooves, and it is preferable that the depth of the recess be in the range of 2 to 50 μm.

It is preferable that each of the reflectors be disposed to have a corresponding position to a contact area at which the adjacent lenses are in contact with each other.

In this connection, the light efficiency of the condensing sheet depends on efficient reflection of light that is incident while deviating from an effective angle, that is, light that is incident at an ineffective angle, by using the reflector.

In order to improve light efficiency, the center of the reflector may have a thickness 112$t$ which is the same as a depth 111$s$ of the recess or larger or smaller than the depth of the recess, and it is preferable that the thickness be in the range of 3 to 100 μm. Additionally, it is preferable that the thicknesses 112$s$ of both sides of the reflector be in the range of 3 to 150 μm on the basis of inclined sides of the recessed portion. The thickness 112$t$ of the center of the reflector and the thicknesses 112$s$ of both sides of the reflector are in proportion to the depth 111$s$ of the recess. If the thickness 112$t$ of the center of the reflector is out of the range of 3 to 100 μm or the thicknesses 112$s$ of both sides of the reflector are out of the range of 3 to 150 μm, workability is reduced.

The thicknesses 112$s$ of both sides of the reflector may be controlled by adjusting the depth of the recess, the shape of the protrusion, physical properties of resin (ink) to which a reflection substance is added to form the reflector, a gravure roll used to perform printing of the reflector, and a printing speed, so that light efficiency is optimized.

It is preferable that the reflector have any one section of a polygonal section that is the shape of a triangle, a square, a trapezoid, a pentagon, or a hexagon, a section that is the shape of polygons continuously connected to each other, an oval section, a section that is the shape of ovals continuously connected to each other, a semicircular section, a section that is the shape of semicircles connected to each other, and a wave section.

Figure 11:
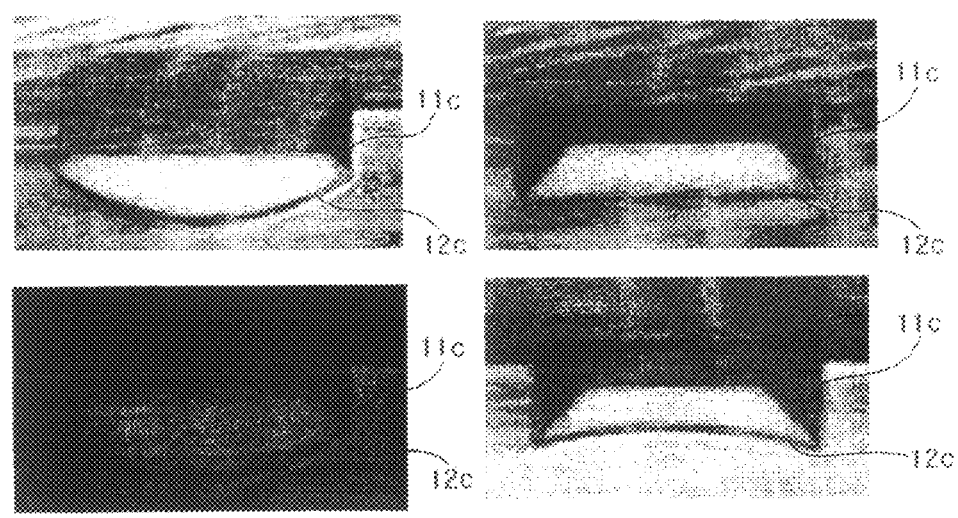

As shown in FIGS. 10 and 11, the reflector may have a trapezoidal section, a triangular section, an oval section, a pentagonal section, a section that is the shape of two triangles continuously connected to each other, or a semicircular section. However, the shape of the reflector is not limited to the shapes of the reflector shown in FIGS. 10 and 11.

Preferably, an exposed surface of the reflector that is received in the recess is any one of a concave surface, a convex surface, and a flat surface.

The reflector may be made of a resin to which a reflection substance is added.

The resin may be any one selected from a UV-curable resin, an electronic beam-curable resin, and a heat-curable resin. Any reflection substance that is known in the related art may be used, and it is preferable that examples of the reflection substance include at least one reflection pigment selected from the group consisting of $TiO_2$, $BaSO_4$, $Al(OH)_3$, $Al_2O_3$, $CaCO_3$, $ZnO$, and $ZnS$. In this connection, it is preferable to use the white reflection pigment. Furthermore, silver particles and aluminum particles may be used as the reflection substance.

It is preferable to add the reflection substance to the resin in an amount of 20 to 80 wt %.

In order to improve optical properties such as contrast, one or more of the painting pigment and the dye may be further added to the resin that is mixed with the reflection substance. It is preferable to use coloring pigments such as red, yellow, green, blue, violet, and black pigments as the further added painting pigment. The reflection and desired colors may be obtained by using the pigment and the dye, and the dye and the pigment are different from each other in that the dye is dissolved in water.

It is preferable that the resin to which the reflection substance is added or the resin to which the reflection substance and the additive are added have a viscosity of 1,000 to 6,000 cps.

In the condensing sheet according to the present invention, since the recess is formed in the protrusion of the light input unit, both sides of the reflector printed in the recess are not thin but have desirable thickness. Therefore, the intensity of light that reflects from the reflector is increased and the intensity of light that passes through the protrusion is reduced, thus improving the reflectivity and hiding power. Thus, light efficiency is maximized to improve luminance and contrast.

According to another embodiment of the present invention, a backlight assembly includes the condensing sheet of the present invention and a light source unit that emits light to the condensing sheet.

The backlight assembly may further include a diffusion sheet that is interposed between the condensing sheet and the light source unit. The backlight assembly may be classified into an edge type and a direct type according to the position of the light source unit.

In the direct type backlight assembly, the light source unit includes a reflection frame having a plurality of reflection units and a plurality of lamps that is disposed to have a corresponding position to a plurality of reflection units.

In the edge type backlight assembly, the light source unit includes a light guide plate that is disposed at a rear portion of the diffusion film and a lamp that is disposed at a side of the light guide plate.

According to still another embodiment of the present invention, a liquid crystal display apparatus includes a liquid crystal display device and a backlight assembly having the condensing sheet of the present invention.

The liquid crystal display element includes a thin film transistor array substrate, a color filter array substrate that is disposed to face the thin film transistor array substrate, and a liquid crystal that is injected between the thin film transistor array substrate and the color filter array substrate.

In the liquid crystal display according to the present invention, when light is radiated from the light source unit to the condensing sheet, the condensing sheet condenses light in a direction perpendicular to the flat surface of the liquid crystal display element to improve luminance.

According to yet another embodiment of the present invention, a method of manufacturing a condensing sheet includes preparing a base layer; forming a plurality of lenses on a first side of the base layer; and forming a light input unit, that includes a plurality of protrusions which each has a structure receiving a reflector in a recess sinking on a surface of the protrusion and a plurality of grooves, on a second side of the base layer.

It is preferable that the reflector be formed in the recess by using anyone printing process of a gravure printing process, an offset printing process, a silk screen printing process, and an ink-jet printing process.

According to a further embodiment of the present invention, a method of manufacturing a condensing sheet includes preparing a sheet, that includes a plurality of lenses formed on a side thereof and a light input unit, which includes a plurality of protrusions which each has a recess and a plurality of grooves, formed on another side thereof, by using an extrusion molding process; and printing a reflector in the recess of the sheet.

Preferably, the sheet is manufactured by the extrusion molding process using one or more resins for extrusion selected from an acryl resin, a polycarbonate resin, a polyester resin, a polyvinyl chloride resin, and a polystyrene resin.

It is preferable that the reflector be formed in the recess by using any one printing process of a gravure printing process, an offset printing process, a silk screen printing process, and an ink-jet printing process.

A plurality of lenses and the light input unit are integrally formed while the base layer is not used and the reflector is printed in the recess of the light input unit to manufacture the condensing sheet.

MODE FOR INVENTION

Figure 8:
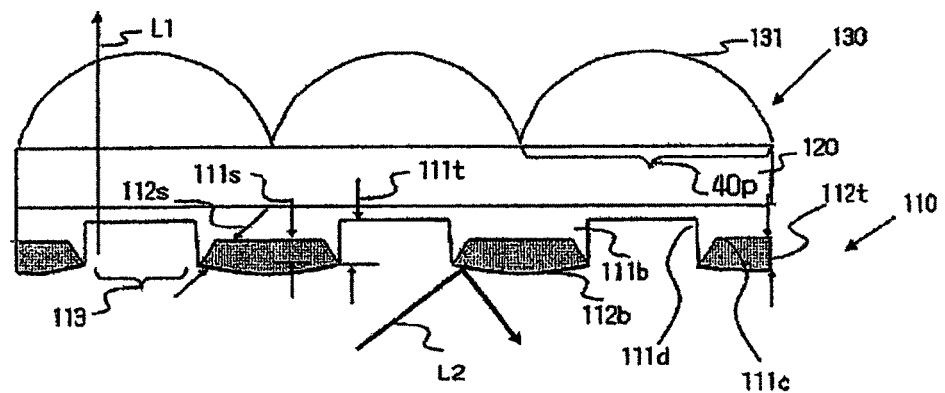
FIG. 8 illustrates light paths of a condensing sheet according to a first embodiment of the present invention.
Figure 9:
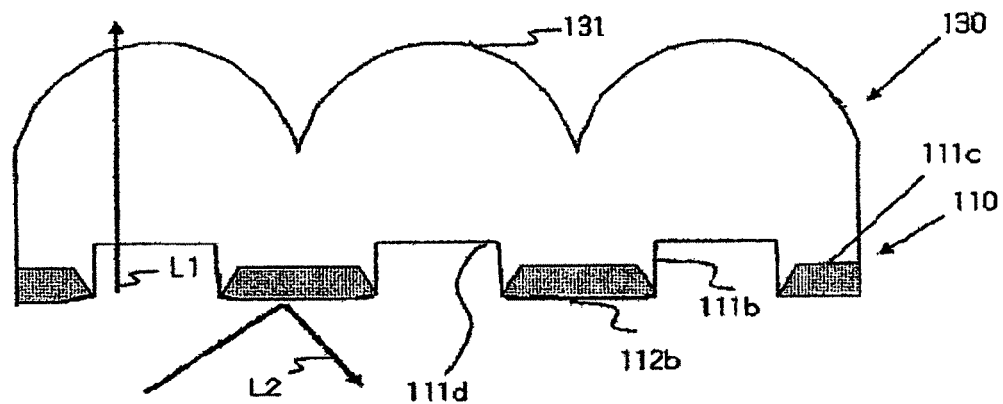
FIG. 9 illustrates light paths of a condensing sheet according to a second embodiment of the present invention.

As shown in FIG. 8, the condensing sheet according to the first embodiment of the present invention includes a light output unit 130 which has a plurality of lenses 131 and emits light, and a light input unit 110 through which light L1 incident at an effective angle passes toward the light output unit 130 and which reflects light L2 incident at an ineffective angle. In the light input unit 110, protrusions 111b and grooves 111d are continuously and alternately arranged. In each of the protrusions 111b, a reflector 112b is formed in a recess 111c that sinks toward the light output unit 130. Furthermore, the condensing sheet further includes a base layer 120 that is interposed between the light output unit 130 and the light input unit 110. As shown in FIG. 9, the condensing sheet according to the second embodiment of the present invention includes a plurality of lenses 131 united with the light input unit 110 and the reflector 112b formed in the recess 111c of the light input unit 110 without the base layer 120 of FIG. 8.

In the condensing sheet according to the first embodiment of the present invention, each of the lenses 131 is a lenticular lens that has a semicircular section, and the lenses 131 are in continuous contact with each other on the first side of the base layer 120.

The light input unit 110 includes the protrusions 111b and the grooves 111d continuously and alternately arranged on the second side of the base layer 120, and the reflectors 112b formed in the recesses 111c of the protrusions 111b. Light L1 that is emitted from a light source unit (not shown) to the condensing sheet at an effective angle is radiated to the grooves 111d and then emitted through the lenses 131. Light L2 that is emitted from the light source unit (not shown) to the condensing sheet at an ineffective angle reflects by the reflectors 112b to turn back to the light source unit.

In the grooves 111d to which light is emitted from the light source unit, a penetration area 113 which has a predetermined depth 111t and through which light is capable of passing is formed.

The recesses 111c of the protrusions 111b are formed to have the same sections as the reflectors 112b, so that the reflectors 112b are received in the recesses 111c.

In this connection, the depth 111s of each of the recesses 111c is smaller than the depth 111t of each of the grooves 111d.

As shown in FIGS. 10 and 11, each of the reflectors 112b may have a trapezoidal section, a triangular section, an oval section, a pentagonal section, a section that is the shape of two triangles continuously connected to each other, or a semicircular section. However, the shape of the reflector is not limited to the shapes of the reflector shown in FIGS. 10 and 11.

An exposed surface of each of the reflectors 112b that are received in the recesses 111c is a convex surface. However, the shape of the reflector 112b is not limited to the shapes of the reflector shown in FIGS. 10 and 11.

A description will be given of a method of forming the reflectors 112b in the recesses 111c with reference to FIG. 12.

After the resin to which the reflection substance is added to form the reflectors 112b is applied on a gravure roll, the gravure roll is pressed on the recesses 111c and the resin to which the reflection substance is added is applied on the recesses 111c to form the reflectors 112b in the recesses 111c.

Therefore, the reflectors 112b are printed in the recesses 111c to a desirable thickness 112t, and the printing is performed so that both sides of each of the reflectors 112b have a desirable thickness 112s.

Figure 13:
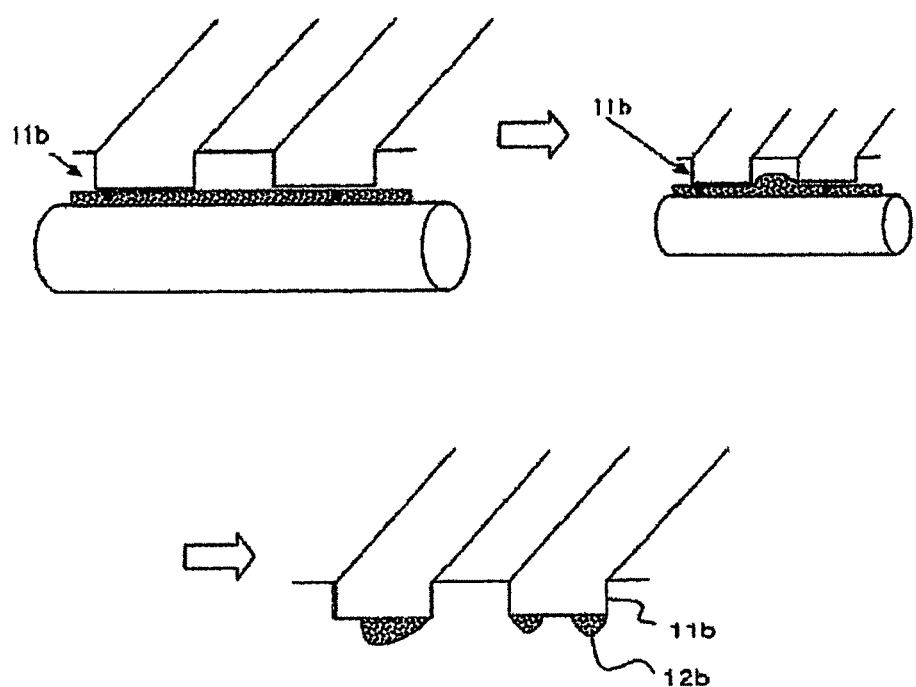
FIG. 13 illustrates printing of a reflector on a flat protrusion according to a Comparative Example.

However, as shown in FIG. 13, if reflectors 12b are printed in flat protrusions 11b, the shapes of the reflectors are nonuniform, the printed reflectors 12b do not have a desirable thickness suitable to improve light efficiency, and both sides of each of the reflectors 12b are printed to have a small thickness. Accordingly, light penetration is increased to reduce hiding power, causing reduction of the luminance and contrast.

However, in the present invention, the recesses 111c are formed in the protrusions 111b and the reflectors 112b are printed in the recesses 111c. Accordingly, since the reflectors 112b are printed in the recesses 111c to have a desirable thickness 112t and both sides of each of the reflectors 112b have a desirable thickness 112s, the intensity of light that reflects by the reflectors 112b of the protrusions 111b is increased and the intensity of light that passes through the protrusions 111b is reduced to improve the reflectivity and the hiding power.

Therefore, light efficiency of the light input unit 110 is maximized to improve optical performances such as luminance and contrast.

Figure 12:
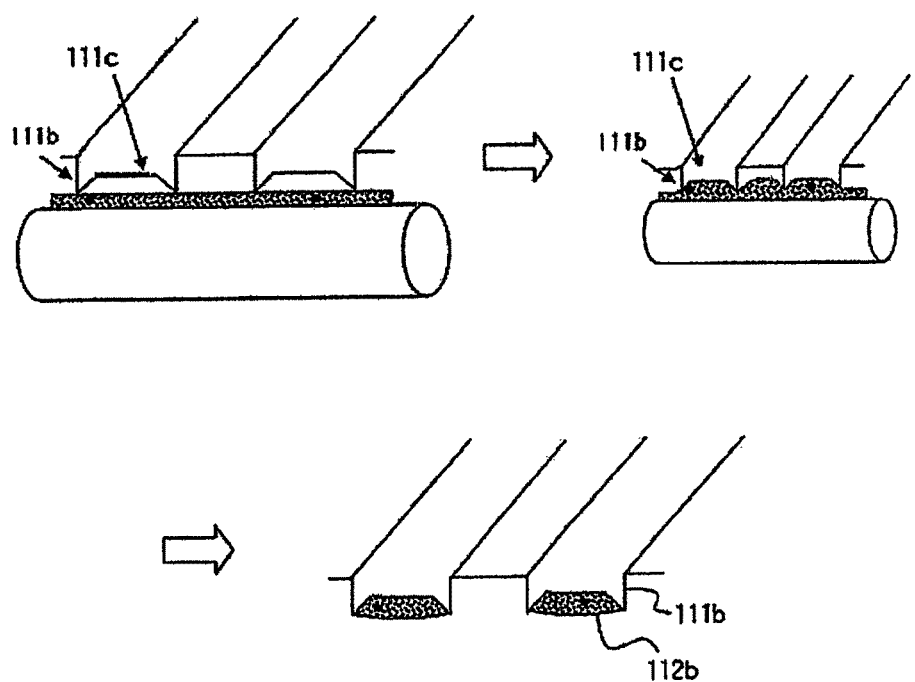
FIG. 12 illustrates printing of the reflector in the recess formed in the protrusion of the condensing sheet according to the present invention.

Furthermore, in the present invention, the resin (ink) to which the reflection substance is added may be uniformly applied on the recesses 111c due to rheological properties of the ink such as surface tension (tension on the surface of a liquid, which has the effect of minimizing its surface area) of the ink, a capillary phenomenon, and a viscosity, which is shown in FIG. 12. Therefore, in the present invention, when the reflectors 12b are printed on the protrusions 11b of FIG. 13 having the flat rectangular section while the recesses are not formed, it is possible to prevent agglomeration of the reflection substance particles due to poor dispersion thereof, nonuniform printing due to the impurity, and formation of the reflectors having the undesirable shape, and to ensure uniformity.

Specifically, in the present invention, when the ink is applied on the recesses 111c of the protrusions 111b to be printed in FIG. 12, a portion of the ink that does not come into direct contact with the recesses has the shape that is almost the same as a sphere due to the surface tension and pressure of the ink, and stable transition of the ink onto the recesses 111c of the protrusions 111b is easily performed in respects to the protrusions 11b of FIG. 12, which does not have the recesses but the flat rectangular section due to a capillary phenomenon. A contact area between the liquid ink and the solid recesses 111c formed in the protrusions 111b is larger than that between the ink and the protrusions 11b of FIG. 13 having the flat rectangular section, in which the recesses are not formed. Therefore, in the present invention, it is possible to increase adhesion strength between the ink and the recesses 111c of the protrusions 111b to be printed, thus achieving the uniform printing. Furthermore, as shown in FIG. 13, the nonuniform printing may occur due to coarse particles contained in the ink (agglomeration of the reflection substance particles or impurity). In the present invention, since the recesses 111c are formed in the protrusions 111b, problems of the nonuniform printing are avoided and the printing uniformity is improved.

Furthermore, rheological properties of the ink such as components, the viscosity, and the surface tension, a transition speed (printing speed) of the ink to the recesses 111c of the protrusions 111b, and the depth 111s of each of the recesses may be adjusted to form the reflectors 112b that are received in the recesses 111c and have an exposed surface which is any one of a concave surface, a convex surface, and a flat surface. Therefore, it is possible to improve optical performances such as a luminance and a viewing angle.

The invention claimed is:

1. A condensing sheet comprising:
   a light output unit that has a plurality of lenses; and
   a light input unit that faces the light output unit and includes a light penetration unit and a light reflection unit,
   wherein the light input unit has grooves and protrusions, the grooves function as the light penetration unit, and the protrusions function as the light reflection unit;
   wherein the protrusions include a recess sinking toward the light output unit, and the recess receives a reflector;
   wherein a center of the reflector has a thickness in the range of 3 to 100 μm, wherein at least two sides of the reflector are inclined, and the thickness of the at least two sides of the reflector along the incline is in the range of 3 to 150 μm, and wherein the at least two sides of the reflector coincide with corresponding inclined sides of the recess;
   wherein the grooves have a depth in the range of more than 0 μm and 100 μm or less, and the recess has a depth in the range of 2 to 50 μm;
   wherein an exposed surface of the reflector that is exposed outside of the recess is a convex surface,
   wherein the recess has a depth which smaller than the depth of each of the grooves,
   wherein the recess has a trapezoidal section,
   wherein the reflector has a trapezoidal section,
   wherein the reflector is made of a resin to which a reflection substance is added in an amount of 20 to 80 wt %, and
   wherein the reflection substance includes at least one reflection pigment selected from the group consisting of $BaSO_4$, $CaCO_3$, ZnO and ZnS, and
   wherein the reflector is disposed to have a corresponding position to a contact area at which the adjacent lenses are in contact with each other, such that the at least two sides of the reflector are inclined toward the contact area at which adjacent lenses are in contact with each other to maximize direct illumination.

2. The condensing sheet according to claim 1, wherein the resin is any one selected from a UV-curable resin, an electronic beam-curable resin, and a heat-curable resin.

3. The condensing sheet according to claim 1, wherein the reflector is made of a resin to which one or more selected from a coloring pigment and a dye and a reflection substance are added.

4. The condensing sheet according to claim 1, wherein the lens is a lenticular lens having a semicircular section or a prism lens having a triangular section.

5. The condensing sheet according to claim 1, wherein the lens is made of any one selected from a UV-curable resin, an electronic beam-curable resin, and a heat-curable resin.

6. The condensing sheet according to claim 1, further comprising a base layer,
   wherein the light output unit that has the plurality of lenses is provided on a first side of the base layer, and the light input unit that has the light penetration unit and the light reflection unit is provided on a second side of the base layer.

7. The condensing sheet according to claim 6, wherein the base layer is made of any one or a resin mixture of two or more of polyester, polyvinyl chloride, polycarbonate, polymethylmethacrylate, polystyrene, polyester sulfone, polybutadiene, polyether ketone, acryl , and olefin resins.

8. A backlight assembly comprising:
   the condensing sheet according to claim 1 and
   a light source unit that emits light to the condensing sheet.

9. A liquid crystal display apparatus comprising:
   a liquid crystal display device; and
   the backlight assembly according to claim 8.

* * * * *